UNITED STATES PATENT OFFICE.

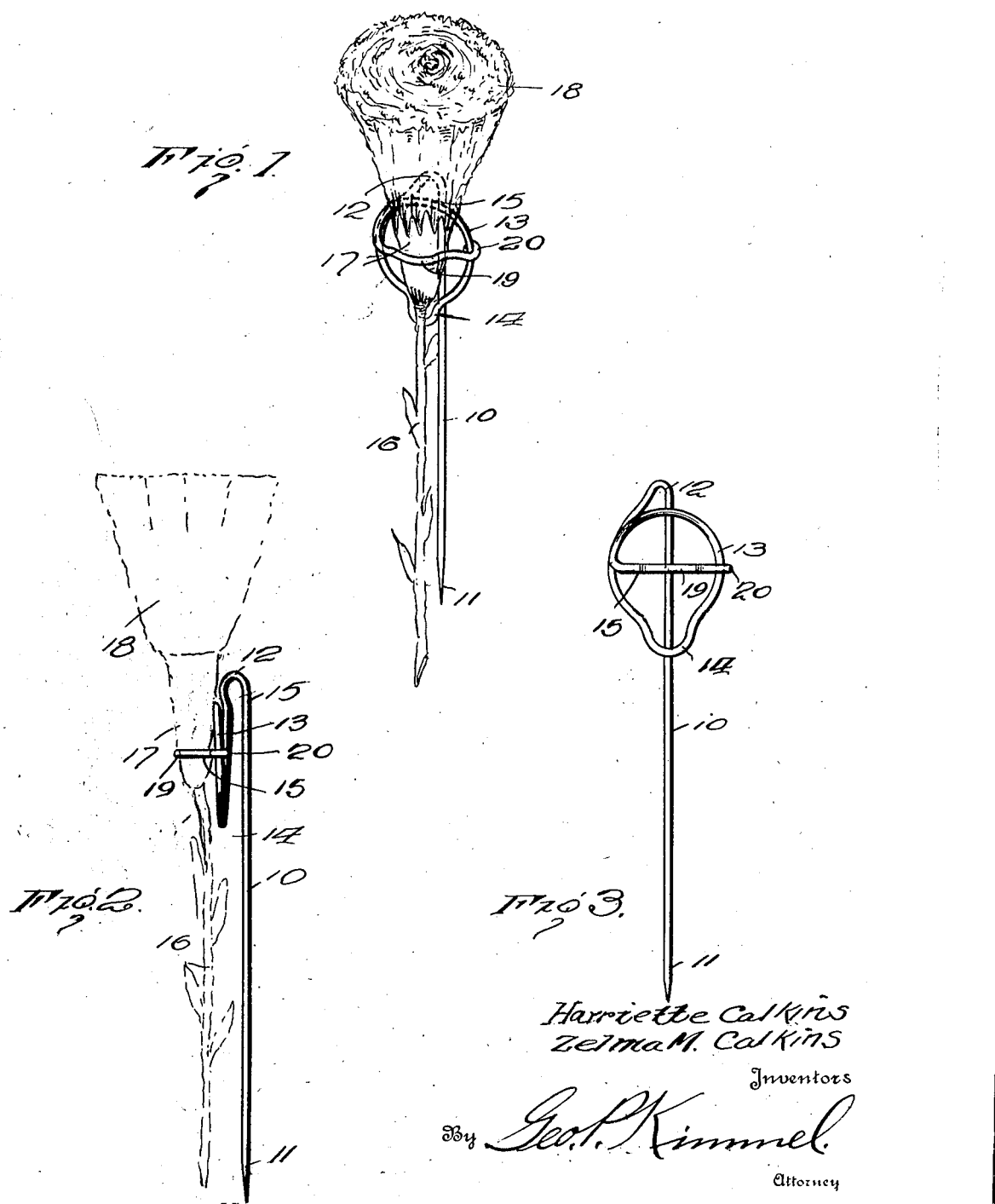

HARRIETTE CALKINS AND ZELMA M. CALKINS, OF VARYSBURG, NEW YORK.

FLOWER-HOLDER.

1,308,623.  Specification of Letters Patent.  Patented July 1, 1919.

Application filed October 11, 1918. Serial No. 257,711.

*To all whom it may concern:*

Be it known that we, HARRIETTE CALKINS and ZELMA M. CALKINS, citizens of the United States, residing at Varysburg, in the county of Wyoming and State of New York, have invented certain new and useful Improvements in Flower-Holders, of which the following is a specification.

This invention relates to a buttonhole flower holder and corsage bouquet holder, adapted to be used to hold a flower instead of projecting the same through a buttonhole, being designed for use by both sexes and made of different sizes as shall be desired, as well as of gold, silver or other precious metal formed into wire.

Further objects of the invention are to provide a novel device of the above character which will permit the secure holding of the flower and which will permit application and removal thereof with ease.

With the above and other objects in view, as will appear as the description proceeds, the invention consists of the novel features of construction, combination of elements and arrangement of parts which will be more fully described herein and set forth with particularity in the claims appended hereto.

Reference is had to the accompanying drawings forming a part of this application, in which like reference characters will indicate corresponding parts throughout the several view, in which Figure 1 is a perspective view of our improved flower holder with a flower held therein, Fig. 2 is a side elevation, and Fig. 3 is a front elevation.

Referring to the drawings in detail, our improved flower holder is shown as comprising a section of wire formed into a shank 10 having a pin point 11 if desired, designed to enter the cloth of the coat or other apparel, when used as a buttonhole flower holder or corsage bouquet holder. It is of course understood that the point 11 can be omitted and the shank extended through the buttonhole or other article of apparel, such as a lady's shirt waist or the like.

The shank 10 is formed at its upper end with a rebent portion 12 extending forwardly and laterally and slightly restricted in diameter with respect to an upper portion or coil 13 formed as a continuation thereof in front of the shank 10 near the upper portion thereof. Immediately below the bent portion 12 below the coil 13, the wire is bent to produce a depending portion 14 of restricted size, the free extremity extending downwardly and transversely as shown at 15, thus producing a substantially bayonet-like slot designed to accommodate the flower stem, the portions 14 and 15 serving to grip the stem portion 16 and base 17 of a flower 18 so as to securely hold the latter in position. To facilitate this, the portion 15 extends diametrically and is bowed outwardly to provide a hump 19 and formed at its free end with a hook 20, to lock or engage around the side of the portion 13, to retain the flower in position.

It will thus be seen that we have provided a simple and efficient form of button hole flower holder or corsage bouquet holder, and it is to be understood that the device can be made of proper flexible wire, which will give the required spring gripping effect, such as for instance steel spring wire suitably plated with gold or silver, or properly tempered gold or silver or other precious metal.

From the foregoing description taken in connection with the accompanying drawings, it is thought that a clear and comprehensive understanding of the construction, operation and advantages of our invention may be had, and while we have shown and described the device as embodying a specific structure, we desire it to be understood that such changes may be made in said structure as do not depart from the spirit and scope of the invention as claimed.

Having thus described our invention, what we claim as new, and desire to secure by Letters Patent of the United States, is:

1. A button hole flower holder and corsage bouquet holder, comprising a shank having the upper end thereof bent laterally to provide a restricted portion and then downwardly to provide a depending restricted portion adapted to receive the stem of a flower, and a coil and transverse portion forming gripping members and adapted to accommodate the base of a flower.

2. A flower holder of the class described comprising a pointed shank, a coil relative to which the shank is diametrically located, said coil being located adjacent one terminal of the shank and having offset portions and a transverse portion bowed forwardly to provide a hump.

In testimony whereof we affix our signatures hereto.

HARRIETTE CALKINS.
ZELMA M. CALKINS.